United States Patent [19]
Hood

[11] Patent Number: 5,115,761
[45] Date of Patent: May 26, 1992

[54] LIGHT CURING APPARATUS FOR A CONTINUOUS LINEAR PRODUCT

[75] Inventor: Randy Hood, Milton, Canada

[73] Assignee: EFOS Inc., Mississauga, Canada

[21] Appl. No.: 594,346

[22] Filed: Oct. 9, 1990

[51] Int. Cl.⁵ .................. B05C 13/02; B05C 11/00
[52] U.S. Cl. .............................. 118/641; 118/65; 118/DIG. 22; 156/380.9
[58] Field of Search ............. 118/65, 620, 641, 234, 118/420, DIG. 18, DIG. 19, DIG. 22; 156/380.9; 219/121.86; 250/493.1; 427/54.1, 55; 264/22, 25; 425/174.4; 34/4, 41

[56] References Cited
U.S. PATENT DOCUMENTS 4,594,266  6/1986  Lemaire et al. .................. 34/41

Primary Examiner—Michael G. Wityshyn
Assistant Examiner—Charles K. Friedman
Attorney, Agent, or Firm—David W. Wong

[57] ABSTRACT

An apparatus for light curing of an adhesive resin coating on a continuous string-like linear product is shown. It consists of an elongated chamber having a light reflective inner side wall and removable end caps. The product coated with the adhesive resin is passed through the chamber through transverse slots formed in the end caps. The ultraviolet curing light is injected into the chamber by a light guide inserted through the peripheral side wall. Nitrogen gas may be also passed through the chamber to enhance the curing process of the resin.

9 Claims, 2 Drawing Sheets

LIGHT CURING APPARATUS FOR A CONTINUOUS LINEAR PRODUCT

BACKGROUND OF THE INVENTION

This invention relates to an apparatus suitable for the continuous light curing of an elongated string-like linear product.

In the process of applying a coating substance such as adhesive onto a continuous linear string-like product such as a thread or wire, it has been necessary to utilize a rather complex curing process. After the adhesive substance has been applied onto the string-like material, the sticky adhesive substance must be cured in a elongated heat chamber in order to effect the bonding between the two materials. The process is relatively time consuming and messy to carry out and it poses a considerable loss in the valuable production time. Furthermore, in some instances the heat curing process may even, in some instances, cause some inherent damage to the string-like material.

Light curable resins are effective adhesive substances which can be cured with ultraviolet light in a relatively short instant. These resins contain light reactive photo-initiators which interact directly with the intense ultraviolet light energy to induce its polymerization. However, due to the continuousness of the string-like material it has been problematic to apply the resin onto the string-like material and to cure it with the ultraviolet light.

SUMMARY OF THE INVENTION

It is the principal object of the present invention to provide an apparatus which is operative for curing efficiently a string-like material having a light curable resin substance coated thereon.

It is another object of the present invention to provide a light curing apparatus which is simple in structure.

These and other objectives and advantages attained by the invention will become more fully apparent when read in view of the following drawings and accompanying description.

DETAILED DESCRIPTION OF THE INVENTION

Figure 1:
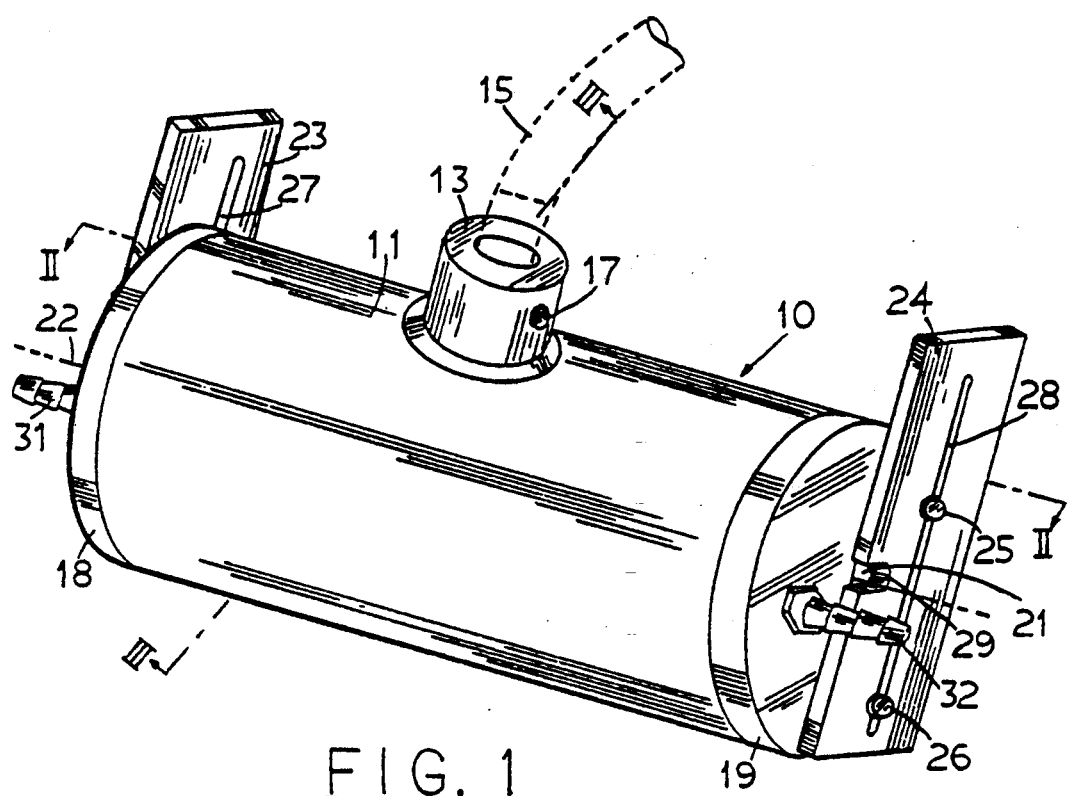
FIG. 1 is a perspective view of the light curing apparatus according to the present invention.
Figure 2:
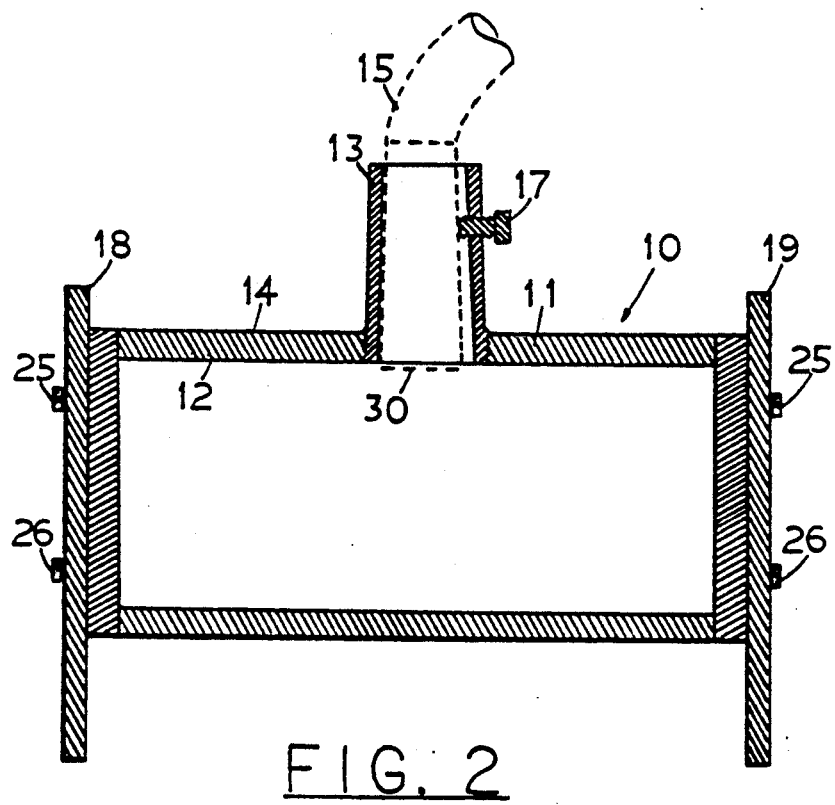
FIG. 2 is a section view thereof along line II—II in FIG. 1.
Figure 3:
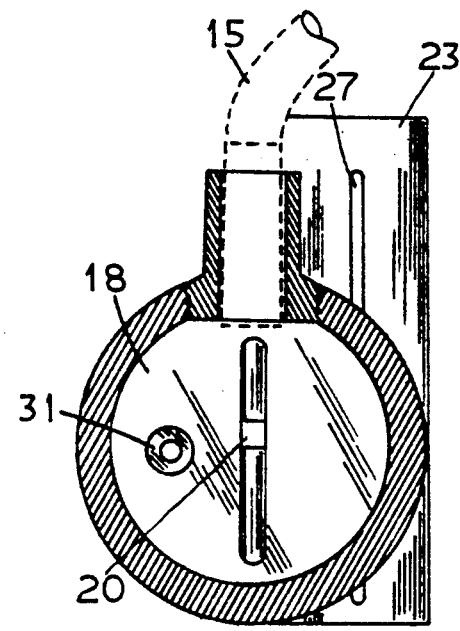
FIG. 3 is a section view thereof along line III—III in FIG. 1.
Figure 4:
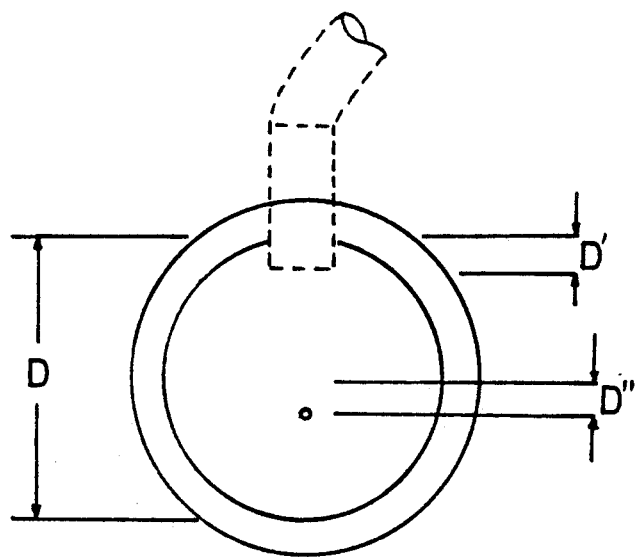
FIG. 4 is a schematic diagram showing the parameters of the formula governing the positioning of the product within the curing chamber.

With reference to the drawings wherein same component parts shown in the various views are indicated by the same reference numerals. The preferred embodiment of the curing apparatus 10 according to the present invention includes a chamber 11 which is preferably cylindrical in shape having a light reflective inner surface 12. The cylindrical chamber 11 may be conveniently made of metal with a polished inner side wall to provide the necessary reflective surface. A tubular light guide holder 13 is mounted at the centre of the circumferential side wall 14 of the cylindrical chamber 11. A light guide 15 may be inserted into the cylindrical chamber 11 through a cylindrical port 16 of the light guide holder 13. The light guide 15 is a flexible tubular optical fibre device commonly referred to as a light wand which can be coupled to a light source (not shown) for conducting either an ultraviolet or visible light into the cylindrical chamber 11. The light guide 15 may eb securedly mounted in place by a set screw 17 provided at the side of the light guide holder 13. One end of the cylindrical chamber 11 intended to be the entrance end is covered by a removable entrance end cap 18, and the other end intended to be the exit end is covered by a similar removable exit end cap 19. Transverse slots 20 and 21 are respectively formed on the end caps 18 and 19. These slots 20 and 21 are formed in a diametrical, manner and preferably vertically across the centre of the end caps 18 and 19 respectively.

The continuous string-like product 22 such as a wire having light curable adhesive resin coated thereon is passed through the cylindrical chamber 11 from the slot 20 at the entrance end cap 18 to the slot 21 at the exit end cap 19.

Masking plates 23 and 24 are respectively mounted on the end caps 18 and 19 by two bolts 25 and 26 extending through the slots 27 and 28 formed in the masking plates 23 and 24, such that the masking plates 23 and 24 may be slidably adjusted to secure at any selected position between an uppermost position in which the bottom edge of the elongated slot abuts the lower bolt 26, and in a lowermost position in which the upper edge of the elongated slot abuts the upper bolt 25. A shallow slot 29 is formed in the inner edge of the masking plates 23 and 24. The inner edge is located adjacent to the longitudinal axis of the cylindrical chamber 11. The shallow slot 29 is in registry with the elongated slots in the end caps, and it is located over the uppermost end portion of the elongated slots when the masking plates are positioned at the lowermost position and it is located over the lowermost end portion of the elongated slots when the masking plates are located at the uppermost position. The shallow slot 29 in the masking plates 23 and 24 may thus be mounted in a selected position for guiding the string-like product 22 through the cylindrical chamber 11, so as to position the product 22 at a predetermined position relative to the tip 30 of the light guide 15 within the cylindrical chamber 11. A curing gas inlet fitting 31 is provided at the entrance end cap 18 and an exhaust fitting 32 is provided at the exit end cap 19. Augmenting gas such as nitrogen may be admitted into the chamber 11 through the inlet fitting 31 and released from the chamber 11 through the exhaust fitting 32 for enhancing the light curing process of the product 22 within the cylindrical chamber 11.

As the product 22 passes through the cylindrical chamber 11, it is exposed to the light conducted into the chamber through the light guide 15. The light within the chamber 11 is reflected from the reflective inner surface 12 to concentrate on the product 22, thus exposing the product 22 to the optimum curing light intensity within the chamber 11 so as to produce the fastest possible cure of the curable resin coated thereon.

The distance of the target, i.e. the product 22 with respect to the longitudinal axis of the chamber 11 may be adjusted depending upon the size of the target i.e. the diameter of the wire. The incursion of the tip 30 of the light guide 15 into the chamber 11 may likewise be adjusted according to the following formulas to provide the optimum curing rate:

$$D'' = [(1-m)/4] \times D$$

$$D' = [(3 \times m - 1)/(4 \times m)] \times D$$

in which
- $D''$ is the distance between the axis of the chamber and the target,
- $D'$ is the incursion of the tip of the light guide into the chamber 11;
- $m$ is the ratio between the target thickness (i.e. wire diameter) and the diameter of the light guide 15;
- $D$ is the inner diameter of the chamber 11.

The length and diameter of the chamber are depending upon the particular application. It can be appreciated by those skilled in the art that additional light guide holders my be provided over the circumference of the chamber 11 in order that additional light guides may be adapted to conduct more ultraviolet light energy into the chamber 11 so as to enhance the speed of curing of the target 22. These additional light guides may be provided at various selected positions over the circumstances of the chamber 11. In this manner, the apparatus according to the present invention may be used for linear products of various thicknesses and it also provides greater flexibility to locate the product 22 at a wider choice of positions parallel to the longitudinal axis of the chamber 11 to be exposed to the maximum irradiances. Furthermore, finite length of target or thick target having a thickness even larger than the diameter of the light guides may be cured directly within the chamber 11. Morever, several such chambers may be placed in tandem for providing repeated curing of the target and/or to provide curing of selected hemisphere of the target in each chamber.

While the invention has been particularly shown and described with reference to a preferred embodiment thereof, it will be understood by those skilled in the art that various changes in form and detail may be made therein without departing from the spirit and scope of the invention.

I claim:

1. A light curing apparatus for a linear product, comprising
   an elongated chamber member having two open ends and a cylindrical inner chamber, said inner chamber having a light reflective side wall,
   a light guide holder means disposed at a selected location on said side wall, said holder means having a circular port operative to receive a light guide to be inserted therethrough to extend into said chamber member,
   end cap means secured to said open ends, each of said end cap means having a transverse slot formed in a diametrical manner therein,
   masking plate means slidably mounted on each of said end cap means and having a shallow slot formed therein, said shallow slot being in registry with said transverse slot formed in said end cap means.

2. A light curing apparatus according to claim 1 including a gas inlet fitting means provided in one end cap means and a gas exhaust fitting means provided in the other end cap means, said gas inlet fitting means being operative to admit a selected gas into said chamber member and said gas exhaust fitting means being operative to release said gas from said chamber member.

3. A light curing apparatus according to claim 2 wherein said chamber member is cylindrical in shape.

4. A light curing apparatus according to claim 3 including at least one additional light guide holder means disposed at another selected location of said circumferential side wall and operative to receive at least an additional light guide to be mounted therein for conducting ultraviolet light energy into said chamber member.

5. A light curing apparatus suitable for curing an elongated linear product having a light curing resin applied thereon, comprising
   an elongated cylindrical chamber member having two open ends and a cylindrical circumferential side wall having a light reflective inner surface,
   a tubular light guide holder means disposed at a centre location of said circumferential side wall, said holder means having a circular port operative to receive an end portion of an ultraviolet light guide means to be inserted therethrough into said chamber member,
   a securing means provided at said holder means and operative for securing said end portion of said light guide means in said holder means,
   an entrance end cap means removably secured to one open end of said chamber member,
   an exit end cap means removably secured to the other open end of said chamber member,
   a first transverse slot formed diametrically in said entrance end cap means,
   a second transverse slot formed diametrically in said exit end cap means,
   a first masking plate means mounted on said entrance end cap means, and a first guiding slot opening formed in said first masking plate means, said slot opening being in registry with said first transverse slot in said entrance end cap means, said first masking plate means being slidably adjustable relative to said entrance end cap means to position said opening over a selected area of said first transverse slot,
   a second masking plate means mounted on said exit end cap means, and a second guiding slot opening formed in said second masking plate means, said second guiding slot opening being in registry with said second transverse slot in said exit end cap means, said second masking plate means being slidably adjustable relative to said exit end cap means, to position said opening over a selected area of said second transverse slot.

6. A light curing apparatus according to claim 5 including a gas inlet fitting means disposed at said entrance end cap means and operative for admitting a cure enhancing gas into said chamber member, and a gas exhaust fitting means disposed at said exit end cap means and operative for releasing said gas from said chamber member.

7. A light curing apparatus according to claim 6 wherein said chamber is made of metal and has a polished cylindrical inner side wall.

8. A light curing apparatus according to claim 7 wherein said gas is nitrogen.

9. A light curing apparatus according to claim 8 wherein said first guiding slot opening and said second guiding slot opening are formed at a side edge of said first masking plate means and second masking plate means respectively.

* * * * *